United States Patent
Scheie et al.

(10) Patent No.: US 7,750,086 B2
(45) Date of Patent: *Jul. 6, 2010

(54) SOLID STATE MODIFICATION OF PROPYLENE POLYMERS

(75) Inventors: Andrew J. Scheie, Cincinnati, OH (US); Manivakkam J. Shankernarayanan, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 926 days.

This patent is subject to a terminal disclaimer.

(21) Appl. No.: 11/362,625

(22) Filed: Feb. 27, 2006

(65) Prior Publication Data

US 2007/0203305 A1 Aug. 30, 2007

(51) Int. Cl.
C08F 8/00 (2006.01)
C08F 8/48 (2006.01)
C08F 8/50 (2006.01)

(52) U.S. Cl. .............. 525/333.8; 525/333.7; 525/326.1; 525/387; 525/376; 252/186.42; 264/345

(58) Field of Classification Search .............. 525/326.1, 525/387
See application file for complete search history.

(56) References Cited

U.S. PATENT DOCUMENTS

| | | | |
|---|---|---|---|
| 3,607,987 A | 9/1971 | Walton | |
| 4,375,531 A | 3/1983 | Ross | |
| 4,508,872 A | 4/1985 | McCullough, Jr. | |
| 5,047,485 A * | 9/1991 | DeNicola, Jr. | 525/387 |
| 5,066,723 A * | 11/1991 | Randall et al. | 525/194 |
| 5,218,046 A | 6/1993 | Audureau et al. | |
| 5,459,201 A | 10/1995 | Shroff et al. | |
| 5,464,907 A | 11/1995 | Jelenic et al. | |
| 5,534,472 A | 7/1996 | Winslow et al. | |
| 5,639,818 A | 6/1997 | Lee et al. | |
| 6,171,993 B1 | 1/2001 | Mavridis et al. | |
| 6,326,434 B1 | 12/2001 | Lee et al. | |
| 6,583,209 B2 | 6/2003 | Mehta et al. | |
| 7,238,754 B1 * | 7/2007 | Scheie et al. | 525/387 |
| 7,399,809 B1 * | 7/2008 | Scheie et al. | 525/387 |

FOREIGN PATENT DOCUMENTS

EP 0907677 B1 6/1997

OTHER PUBLICATIONS

Sugimoto, M., et al.: "Effect of Chain Structure on the Melt Rheology of Modified Polypropylene" *J. Applied Polymer Science*, vol. 73: 1493-1550 (1999).
Shroff, R., et al.: "New Measures of Polydispersity from Rheological Data on Polymer Melts" *J. Applied Polymer Science*, vol. 57: 1605-1626 (1995).
Ross, J.F., et al.: "An Improved Gas-Phase Polypropylene Process" *Ind. Eng. Chem. Prod. Res. Dev.* 24:149-154 (1985).

* cited by examiner

*Primary Examiner*—Vasu Jagannathan
*Assistant Examiner*—Robert C Boyle
(74) *Attorney, Agent, or Firm*—Gerald A. Barabcka; Jonathan L. Schuchardt

(57) ABSTRACT

A process for improving the melt characteristics of propylene-ethylene random block and impact copolymers is provided. The process involves contacting a powder of the copolymer with a low level of free radical initiator followed by heating at a temperature below the melting point of the copolymer and above the free radical initiation temperature.

12 Claims, No Drawings

SOLID STATE MODIFICATION OF PROPYLENE POLYMERS

FIELD OF THE INVENTION

The invention relates to a process for the modification of propylene polymers to improve the processability and melt characteristics of the resins. More specifically, the invention relates to a process for the solid state modification of propylene polymer powders utilizing free radical initiating agents to improved resins produced by such modification.

BACKGROUND OF THE INVENTION

Whereas propylene homopolymer, i.e., polypropylene (PP), and blends of PP with other polyolefins, such as ethylene homopolymers and copolymers, are highly useful, one widely recognized deficiency which limits their utility for certain applications is their relatively low melt strength due to the linearity of the PP. Efforts to increase melt strength have focused on the introduction of molecular features onto the polymer backbone which will increase entanglement between molecular chains. This has typically been accomplished by grafting various monomers onto the PP or by various procedures capable of modifying the chain structure, such as by the introduction of long-chain branching.

Sugitomo, et al., in their article entitled "Effect of Chain Structure on the Melt Rheology of Modified Polypropylene" (*Journal of Applied Polymer Science*, Vol. 73, 1493-1550 (1999)) disclose the use of electron irradiation and di-2-ethylhexyl peroxy dicarbonate to modify the molecular structure of linear PP and show the effect on rheological properties. Whereas treatment at high irradiation levels produced long-chain branching, they were unable to detect any long-chain branching upon treatment with the organic peroxide. They concluded that reaction with 1.2 weight percent peroxide only produced a small increase in molecular weight, as evidenced by an increase in melt flow rate (MFR) of about 2 units.

Organic peroxides are widely used with PP and PP/PE blends for visbreaking. Visbreaking involves heating the PP or mixture of PP with a peroxide in the melt phase in an extruder or similar mixing device capable of imparting a lower molecular weight product and, accordingly, increasing the MFR. In some instances, visbroken polymers can be produced without the use of peroxides by thermal cracking. Procedures for visbreaking various propylene polymer compositions are disclosed in U.S. Pat. Nos. 3,607,987; 4,375,531; 4,508,872; 5,066,723 and 5,218,046.

U.S. Pat. No. 5,639,818, while recognizing that polymers or polymer blends which are visbroken by conventional procedures, do not contain long-chain branching and accordingly are deficient in melt strength, discloses a multi-step process whereby PP/PE blends having improved melt strength are produced. The process comprises adding a peroxide in an amount ranging from about 100 to about 1000 ppm to a non-crosslinked LDPE or an ethylene copolymer containing a vinyl acetate, a methyl acrylate, a n-butyl acrylate, an α,ω-diene or an unsaturated alkoxysilane for a period of time to produce a peroxide-adsorbed component and melt mixing the peroxide-adsorbed polymeric component with a polypropylene homopolymer at a temperature of about 170° C. to about 300° C. wherein the polymeric blend comprises about 5 to about 40 weight percent of the non-crosslinked polymeric component and about 95 to about 60 weight percent of the polypropylene homopolymer.

It would be highly advantageous if propylene polymers could be modified using organic peroxides to produce long-chain branching and improve melt strength. It would be even more advantageous if this could be accomplished using low levels of peroxide and in the solid state. These and other advantages are achieved with the improved process of the present invention.

SUMMARY OF THE INVENTION

A process for the modification of propylene-ethylene copolymers in the solid state to improve their melt characteristics is provided. The process comprises contacting a propylene-ethylene copolymer resin powder with an effective amount of free radical initiator at a temperature above the initiation temperature of the organic free radical initiator and below the melting point of the copolymer. More specifically, the process comprises adsorbing 0.5 to 500 ppm free radical initiator selected from the group consisting of organic peroxides, organic hydroperoxides and azo compounds on a powder of said copolymer having an average particle size from 5 to 2500 microns to uniformly distribute the free radical initiator throughout the entire powder volume and heating the powder at a temperature from 40° C. to 160° C. for a period of time sufficient to decompose substantially all of the free radical initiator and increase the ER of the copolymer at least 5 percent.

Propylene-ethylene copolymers modified in accordance with the process of the invention will contain 55 to 99.5 wt. % propylene and 0.5 to 45 wt. % ethylene and include random, block and impact copolymers.

In a highly useful embodiment, copolymer powders having average particle sizes from 75 to 2000 microns are combined with from 1 to 250 ppm organic peroxide selected from the group consisting of dicumyl peroxide, 2,5-dimethyl-2,5-di(t-butylperoxy)hexane and t-amyl peroxypivalate and heated at 75° C. to 130° C. to effect the desired modification.

DETAILED DESCRIPTION OF THE INVENTION

The present invention is a process for the modification of propylene polymer resins processability and melt characteristics of the resins. The process involves the solid state modification of propylene powder powders, also referred to herein as the base resins, by incorporating low levels of a free radical initiator into the resin powder followed by controlled heating of the mixture below the melting point of the resin to effect changes in one or more melt characteristics of the resin. Observed melt enhancements can include improved melt strength, improved melt elasticity and improved processability.

Propylene polymers modified in accordance with the process of the invention are propylene-ethylene copolymer resins having propylene as the major constituent, i.e., propylene contents greater than 50 weight percent (wt. %), and ethylene as the minor component. Small amounts of additional monomers, e.g., butene-1 may also be included. These polymers include random, block and impact copolymers and mixtures thereof. The latter can be produced by physical blending or they may be reactor produced blends. If the base resin is a mixture, one or more of the constituents can be PP homopolymer or PE homopolymer provided at least one or more of the other constituents is a propylene-ethylene copolymer and the mixture contains 50 wt. % or more propylene.

Especially useful propylene copolymers will contain 55 to 99.5 weight percent propylene and 0.5 to 45 weight percent ethylene. Even more preferred propylene polymer compositions for the invention comprise 65 to 99.5 percent propylene and 0.5 to 35 percent ethylene. These weight percentages are for the overall propylene polymer compositions, so that if the composition is comprised of two or more different propylene polymer components, the monomer contents of the individual polymer components comprising the blend may be outside the specified ranges.

In a highly useful embodiment, propylene-ethylene copolymers comprised of two phases—a continuous phase of highly isotactic polypropylene homopolymer or a semi-crystalline high propylene-ethylene copolymer and a dispersed phase of rubber-like propylene-ethylene copolymer. Depending on the relative proportion of the continuous and disperse phases, these compositions are classified as either impact copolymers or thermoplastic polyolefins (TPOs)—the latter having a significantly higher rubber/elastomer content. Ethylene contents of these polymers will generally range from about 8 weight percent up to about 30 weight percent.

While these types of products can be produced by melt compounding individual polymer components, existing multi-reactor technology makes it possible to directly produce these products. This is conveniently accomplished by polymerizing propylene or propylene and ethylene in a first reactor and discharging the crystalline polymer produced therein into a secondary reactor where propylene and ethylene are copolymerized in the presence of the crystalline polymer. Gas-phase polymerizations of this type are described in the article by Ross, et al., "*An Improved Gas-Phase Polypropylene Process.*" Ind. Eng. Chem. Prod. Res. Dev. 1985, 24, 149-154.

Typically, in a first reactor, propylene is homopolymerized or copolymerized with ethylene at a temperature from 50° C. to 100° C. and pressure from 250 psig to 650 psig utilizing a titanium catalyst and an organoaluminum cocatalyst. The highly isotactic homopolymer or copolymer produced in the first reactor is then directly fed into a second reactor typically maintained at 25° C. to 80° C. and 100 psig to 500 psig where propylene and ethylene are copolymerized in the presence of the polymer from the first reactor. The amount of ethylene employed in the second reactor is sufficient to produce a copolymer of propylene and ethylene with rubber-like characteristics. Polymerization in the second reactor is generally accomplished without additional catalyst; however, it may be advantageous, to introduce more catalyst to the second reactor. If more catalyst is employed, it can be the same as the catalyst used in the first polymerization or different.

High activity titanium catalysts, activated by contacting with an organoaluminum cocatalyst, are generally utilized for the gas-phase polymerizations. The polymerizations are carried out in the substantial absence of liquid reaction medium and gas velocity within the stirred-bed is maintained below the onset of fluidization. Depending on their compositional makeup, gases can be recirculated through external heat exchangers for cooling or partially condensed. Cooled monomer is recirculated into the reactor and provides thermal control. Recirculated monomer vaporizes when it is introduced into the reactor so that polymerization occurs in the gas phase. In the preferred mode of operation, i.e., stirred, fixed-bed gas phase, the first and second reactors are fitted with spiral agitators to maintain a turbulent mechanically fluidized bed of polymer powder and prevent agglomeration. Hydrogen is generally included in both reactors for control of molecular weight. The amount of hydrogen can range from 0.1 up to about 10 mole percent.

Each reactor typically has its own control system(s) and is capable of independent operation. In the usual conduct of the process, propylene and ethylene monomers are passed through desiccant beds prior to introduction. Means are usually provided to individually meter the propylene, ethylene, hydrogen for molecular weight control, catalyst and cocatalyst. This makes it possible to more readily control and maintain the desired reactor conditions. If desired, monomer may be injected into the recirculated gas stream for introduction into the system. Suitable controls are also provided to vary the pressure, temperature and compositional analysis to facilitate maintaining a constant environment in the reactor and/or to permit adjustment of conditions to bring the system into conformance. Residence times in both reactors are generally on the order of 1 to 4 hours.

Propylene-ethylene copolymer resins utilized for the solid state modification procedure of the invention are in powder form and have average particle sizes from about 5 to about 2500 microns. Resins within this particle size range are typically produced by gas phase polymerization processes or using slurry, i.e., particle form, polymerization technology. Base resin powders having average particle sizes ranging from 75 to 2000 microns and, more preferably, from 100 to 1700 microns are most advantageously employed.

Free radical initiators, preferably organic peroxides, are utilized for the modification procedure. The free radical initiator is combined with the base resin powder and adsorbed on the powder particles. Any suitable mixing means whereby the free radical initiator is distributed throughout the entire powder volume and uniformly adsorbed on the powder particles can be employed. Such methods may include stirring, rolling, tumbling, fluidization and the like.

Alternatively, the free radical initiator may be directly added to propylene-ethylene copolymer reactor powders as they exit the polymerization reactor or at any stage in the powder handling/recovery/storage process. As a result, the temperature at which the free radical initiator and resin powder are combined and mixed can vary over a wide range. The only requirement in this regard is that the temperature not be so high as to decompose the free radical initiator to such an extent that it is ineffective for modification before it is uniformly distributed in the powder. If the temperature of the reactor powder is too high it will be necessary to either cool the powder before addition of the free radical initiator and/or use a free radical initiator having a higher initiation temperature.

The free radical initiator may be combined with a suitable solvent to facilitate distribution within the resin powder. Use of a solvent also enables the use of solid free radical initiators. If a solvent is used, it will preferably be an organic hydrocarbon having a sufficiently low boiling point so that it will be volatilized during mixing and/or the subsequent heating.

Free radical initiators employed for the modification process include organic peroxides, organic hydroperoxides and azo compounds which decompose at temperatures below the melting point of the propylene-ethylene base resin. Examples of suitable organic peroxides are dicumyl peroxide, di-t-butyl peroxide, t-butylperoxybenzoate, 2,5-dimethyl-2,5-di(t-butylperoxy)hexane, t-butyl peroxyneodecanoate, 2,5-dimethyl-2,5-di(t-butylperoxy)hexyne, t-amyl peroxypivalate, 1,3-bis(t-butylperoxyisopropyl)benzene, and the like. Representative hydroperoxides include di-t-butyl hydroperoxide, t-butyl hydroperoxide and the like. Suitable azo compounds include 2,2'-azo-diisobutyronitrile, 2-phenylazo-2,4-dimethyl-4-methoxyl-valeronitrile, 2,2'-azobis(N-butyl-2-methylpropionamide), and the like.

Organic peroxides are most advantageously used and dicumyl peroxide, 2,5-dimethyl-2,5-di(t-butylperoxy) hexane and t-amyl peroxypivalate are particularly useful organic peroxides for the present modification process.

Modification is brought about by maintaining the resin powder having the free radical adsorbed thereon at a temperature below the melting point of the resin and for a period of time sufficient to effect the desired change in melt characteristics. The temperature and time will vary depending on the particular propylene-ethylene copolymer resin being modified, the amount and type of free radical initiator used, powder particle size and other factors. In general, however, temperatures within the range 40° C. to 160° C. are employed. More preferably, the temperature is maintained with the range 50° C. to 140° C. and, most preferably, from 75° C. to 130° C.

For most operations, and particularly large scale operations, the modification time is several times the initiator's half life. This provides maximum modification and also minimizes the possibility of undesirable initiator residue in the modified resin. Although low levels of undecomposed initiator are not detrimental, the presence of significant amounts of unreacted initiator in the modified resin powder can produce undesirable effects during subsequent processing/fabrication of the modified resin.

While the amount of free radical initiator used can vary, high levels of initiator are detrimental and do not produce the desired modification, i.e., improvement in melt characteristics. For this reason, the amount of free radical initiator combined with the powder will generally be in the range from about 0.5 to 500 ppm. The free radical initiator is more preferably utilized in an amount from about 1 to 250 ppm and, in a particularly useful embodiment, from about 2 ppm to 100 ppm free radical initiator is employed. The latter ranges are particularly useful when organic peroxide initiators are employed. It is not necessary that all of the initiator be decomposed in order to effect modification of the resin; however, as pointed out above, large excesses of undecomposed initiator are generally considered to be undesirable.

As previously pointed out, the free radical initiator may be added directly to the reactor powder, i.e., resin exiting the polymerization reactor(s), or the powder can be stored for a period of time and subsequently modified. In the first case the powder may be sufficiently warm, i.e., at or above the initiation temperature of the organic initiator, to effect modification of the resin without additional heating. For example, in slurry, i.e., particle form, polymerization processes, where slurry from the reactor is sent to a flash drum for removal of solvent and unreacted monomers and then dried in one or more driers, the free radical initiator can be mixed with the propylene polymer powder in the flash drum and the modification can occur in the driers. In other manufacturing operations, the initiator can be combined with warm polymer powder prior to transfer to a storage silo where the mixture can be held for a sufficient period for modification to occur.

If the resin to be modified is at ambient temperature or sufficiently below the free radical initiation temperature, as it would be the case if the resin were stored for an extended period prior to modification, additional heating may be required. In this case, and preferably after incorporation/uniform distribution of the organic initiator in the resin powder, the temperature of the mixture is raised above the initiation temperature of the free radical initiator but below the melting point of the propylene-ethylene copolymer to effect modification. As employed herein, initiation temperature refers to the temperature at which the initiator will begin to decompose and generate free radicals.

Modifying propylene-ethylene copolymer powders of the above types in the solid state using low levels of free radical initiators, particularly organic peroxides, in accordance with the invention produces significant improvement in resin melt characteristics. Enhanced melt characteristics of the solid state-modified resins are demonstrated by comparing various dynamic rheological data generated for unmodified base resin and resin modified in accordance with the invention. These data are generated using any rheometer capable of measuring dynamic mechanical properties of polymer melts over a range of frequencies such as a Rheometric Mechanical Spectrometer Model 605 or 705 or Rheometrics Dynamic Analyzer RDA2 or ARES Analyzer.

More specifically, propylene-ethylene copolymer resins modified in accordance with the invention exhibit significantly improved rheological polydispersity. Rheological polydispersity, which is obtained from rheological measurements performed on molten resins and is influenced by the type and amount of branching, chain extension and other inter- and intramolecular interactions, is commonly used to show changes in melt elasticity and "ER" is one of the art-recognized measures of rheological polydispersity. ER is determined from plots of storage modulus (G') versus loss modulus (G") and is a measure of high-molecular-weight-end polydispersity. ER is conveniently determined as discussed in R. Shroff and H. Mavridis, "New Measures of Polydispersity from Rheological Data on Polymer Melts," *J. Applied Polymer Science* 57 (1995) 1605. See also U.S. Pat. Nos. 6,171, 993 and 5,534,472, the teachings of which are incorporated herein by reference.

Propylene-ethylene copolymers modified in accordance with the present process by contacting the resin powders with low levels of free radical initiators in the solid state exhibit an increase in ER indicating the presence of long-chain branching. Utilizing the solid state modification process of the invention, ERs are maintained and my be increased by at least 5%. More preferably, the ER of the modified copolymer is increased by 10% or more. Moreover, the increase in ER may be accomplished without significantly reducing the weight average molecular weight, i.e., increasing the MI, as occurs when propylene polymers are typically visbroken using peroxides. The ability to increase ER of the propylene-ethylene copolymers by introducing long-chain branching is unexpected in view of the statements in the prior art that visbroken polypropylene blends do not contain long-chain branching and the fact that when PP homopolymer is modified in accordance with the process of the invention there is a significant increase in MI and reduction in ER.

Propylene copolymer resins modified in accordance with the above-described solid state procedure are advantageously utilized in applications where good processability and melt properties are desirable, such as for extrusion coating, thermoforming and blow molding. They are highly useful for the production of films, sheets, pipes and profiles.

The following laboratory scale experiments illustrate the invention; however, those skilled in the art will recognize numerous variations within the spirit of the invention and scope of the claims.

Rheological Measurements and Calculations: Rheological measurement were performed in accordance with ASTM 4440-95a, which measures dynamic rheology data in the frequency sweep mode. A Rheometrics ARES rheometer was used. Unless otherwise indicated the rheometer was operated at 210° C. in the parallel plate mode in a nitrogen environment to minimize sample oxidation/degradation with a gap in the parallel plate geometry of 1.2-1.4 mm and strain amplitude of 20%. Frequencies ranged from 0.0251 to 398.1 rad/sec.

As will be recognized by those skilled in the art, specific complex viscosity data referred to herein are provided only to demonstrate the improvements observed with the modified resins of the invention relative to the unmodified base resin and are not intended to be limiting since they are generated under a specific set of conditions. Rheological data generated using different conditions, e.g., temperature, percent strain, plate configuration, etc., could result in complex viscosity values which are higher or lower than those reported. $\eta^*$ values reported herein are in poise.

ER was determined by the method of Shroff, et al., supra (see also U.S. Pat. No. 5,534,472 at Column 10, lines 20-30). Storage modulus (G') and loss of (G") were measured. The nine lowest frequency points were used (five points per frequency decade) and a linear equation was fitted by least-squares regression to log G' versus log G". ER was then calculated from:

$$ER=(1.781\times10^{-3})\times G'$$

at a value of G"=5,000 dyn/cm².

As those skilled in the art will recognize, when the lowest G" value is greater than 5,000 dyn/cm², the determination of ER involves extrapolation. The ER values calculated then will depend on the degree on nonlinearity in the log G' versus log G" plot. The temperature, plate diameter and frequency range are selected such that, within the resolution of the rheometer, the lowest G" value is close to or less than 5,000 dyne/cm².

Molecular Weight Determination: Weight average molecular weight of the polymers were obtained by gel permeation chromatography (GPC) using a Waters GPC2000CV high temperature instrument equipped with a mixed bed GPC column (Polymer Labs mixed bed B-LS). Samples were prepared by dissolving 6 mg of the resin in 2.75 ml 1,2,4-trichlorobenzene. The mobile phase was used at a nominal flow rate of 1.0 ml/min and temperature of 145° C.

Molecular weights were calculated using a narrow polystyrene calibration curve using appropriate Mark-Houwink constants and Waters Empower software. The Mark-Houwink constants, K and alpha, were 0.00041 and 0.657 respectively, for the propylene copolymer and 0.0001387 and 0.7 for polystyrene.

Solid State Modification: A commercial propylene-ethylene impact copolymer powder (MI 3.5 g/10 min.; 7.5 wt. % ethylene; weight average molecular weight 404,000) was modified in accordance with the invention. The powder had an average particle size of 1500 microns. The impact copolymer powder was combined with 10 ppm 2,5-dimethyl-2,5-di-(t-butylperoxy) hexane and tumbled for 15 minutes at 25° C. to insure uniform distribution and adsorption on the powder particles. The powder was then transferred to an oven and heated at 120° C. for 20 hours after which time essentially all of the peroxide was decomposed. Rheological properties of the resin (MI and ER) as well as molecular weight were determined and results are provided in the following table along with the data for the starting resin, i.e., unmodified impact copolymer.

| Solid State | MI | ER | MW |
|---|---|---|---|
| Modified Impact Copolymer | 9.0 | 1.48 | 329,000 |
| Unmodified Impact Copolymer | 3.5 | 1.21 | 404,000 |

Whereas the solid state modified impact copolymer had a slight increase in MI and reduction in MW, presumably due to some visbreaking, i.e., chain scission, the ER was unexpectedly higher (an increase of approximately 22%) confirming the formation of long-chain branches.

Similar improvement in ER confirming the formation of long-chain branching is observed when powders of random propylene-ethylene copolymers are peroxide modified as described above.

Comparative Example

To demonstrate the significance and unexpected nature of the above result, a PP homopolymer (MI 17.3 g/10 min) was modified in the solid state using the above-described procedure. With the PP homopolymer, no increase in ER is observed using peroxide levels from 10 to 100 ppm. Rather, ER is decreased and there is a significant increase in MI which is consistent with results obtained when PP homopolymers are visbroken using peroxides and conventional melt extrusion procedures. For example, results at the 100 ppm peroxide treatment level were as follows:

| Solid State | MI | ER | MW |
|---|---|---|---|
| Modified PP Homopolymer | 97.2 | 0.97 | 230,000 |
| Unmodified PP Homopolymer | 17.3 | 1.35 | 340,000 |

We claim:

1. A process for modifying the melt properties of propylene-ethylene copolymers comprising contacting a propylene-ethylene copolymer resin powder having an average particle size from 5 to 2500 microns with 0.5 to 500 ppm of a free radical initiator selected from the group consisting of organic peroxides, organic hydroperoxides and azo compounds at a temperature above the initiation temperature of the free radical initiator and below the melting point of the copolymer, said propylene-ethylene copolymers containing 55 to 99.5 wt. % propylene and 0.5 to 45 wt. % ethylene and selected from the group consisting of random copolymers, block copolymers and impact copolymers.

2. The process of claim 1 wherein the free radical initiator is an organic peroxide utilized in an amount from 1 to 250 ppm.

3. The process of claim 2 wherein the free radical initiator is selected from the group consisting of dicumyl peroxide, 2,5-dimethyl-2,5-di(t-butylperoxy)hexane and t-amyl peroxypivalate.

4. The process of claim 1 wherein the powder has an average particle size from 75 to 2000 microns, the free radical initiator is an organic peroxide and the powder and organic peroxide are contacted at a temperature from 40° C. to 160° C.

5. The process of claim 4 wherein the propylene-ethylene copolymer is a random copolymer containing 65 to 99.5 wt. % propylene and 0.5 to 35 wt. % ethylene.

6. The process of claim 4 wherein the propylene-ethylene copolymer is an impact copolymer containing 65 to 99.5 wt. % propylene and 0.5 to 35 wt. % ethylene.

7. A process for modifying the melt characteristics of propylene-ethylene copolymers containing 55 to 99.5 wt. % propylene and 0.5 to 45 wt. % ethylene comprising adsorbing 0.5 to 500 ppm of a free radical initiator selected from the group consisting of organic peroxides, organic hydroperoxides and azo compounds on a powder of said copolymer having an average particle size from 5 to 2500 microns to uniformly distribute the free radical initiator throughout the entire powder volume and heating the powder at a temperature from 40° C. to 160° C. but below the melting point of the propylene-ethylene copolymer for a period of time sufficient to decompose substantially all of the free radical initiator and increase the ER of the copolymer at least 5 percent.

8. The process of claim 7 wherein the free radical initiator is an organic peroxide.

9. The process of claim 8 wherein the powder has an average particle size of 75 to 2000 microns, the organic peroxide is utilized in an amount from 1 to 250 ppm and the powder is heated at a temperature from 50° C. to 140° C.

10. The process of claim 9 wherein the organic peroxide is selected from the group consisting of dicumyl peroxide, 2,5-dimethyl-2,5-di(t-butylperoxy)hexane and t-amyl peroxypivalate.

11. The process of claim 9 wherein the organic peroxide is utilized in an amount from 2 to 100 ppm and the powder is heated at a temperature from 75° C. to 130° C.

12. The process of claim 8 wherein the ER of the copolymer is increased by at least 10 percent.

* * * * *